United States Patent
Huang et al.

(10) Patent No.: US 7,445,368 B2
(45) Date of Patent: Nov. 4, 2008

(54) BACKLIGHT MODULE AND LIQUID CRYSTAL DISPLAY USING SAME

(75) Inventors: Xiong-Biao Huang, Shenzhen (CN); Zheng-Xiao Chen, Shenzhen (CN); San-Dan Zhao, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 37 days.

(21) Appl. No.: 11/645,440

(22) Filed: Dec. 26, 2006

(65) Prior Publication Data

US 2008/0151141 A1  Jun. 26, 2008

(30) Foreign Application Priority Data

Dec. 23, 2005  (TW) .............................. 94146358 A

(51) Int. Cl.
*F21V 7/04* (2006.01)

(52) U.S. Cl. ...................................... 362/609; 362/612
(58) Field of Classification Search ................... 362/27, 362/609, 612, 800
See application file for complete search history.

(56) References Cited

U.S. PATENT DOCUMENTS

| | | | |
|---|---|---|---|
| 6,508,564 B1 * | 1/2003 | Kuwabara et al. | 362/612 |
| 7,036,972 B2 | 5/2006 | Kubomura et al. | |
| 7,125,152 B2 * | 10/2006 | Lin et al. | 362/609 |
| 7,293,906 B2 * | 11/2007 | Mok et al. | 362/609 |

* cited by examiner

*Primary Examiner*—Stephen F Husar
(74) *Attorney, Agent, or Firm*—Wei Te Chung

(57) ABSTRACT

An exemplary backlight module (22) includes a light guide plate (21), an illumination device (20), and plural reflection sheets (23). The illumination device is opposite to the light guide plate, and includes a supporting member (242), and plural light emitting diodes (240) formed at the supporting member. The plural reflection sheet is integrally formed with the supporting member.

10 Claims, 3 Drawing Sheets

BACKLIGHT MODULE AND LIQUID CRYSTAL DISPLAY USING SAME

FIELD OF THE INVENTION

The present invention relates to backlight modules and liquid crystal displays using the same, and more particularly to a backlight module using light emitting diodes and a liquid crystal display using the backlight module configured to provide a high light utilization.

BACKGROUND

A typical liquid crystal display generally includes a liquid crystal panel, and a backlight module. The backlight module includes a light source, a reflection cover, and a light guide plate combined to provide a uniform plane light for illuminating the liquid crystal panel.

Referring to FIG. 7, this shows an exploded view of a conventional backlight module 1 of a liquid crystal display. The backlight module 1 includes a frame 11, an illumination device 14, a rectangular reflection cover 13, a reflection sheet 15, and a light guide plate 16. The light guide plate 16 includes a light emitting surface 161, a light entering surface 162, and a bottom surface 163 parallel to the light emitting surface 161 and substantially perpendicular to the light entering surface 162. The reflection sheet 15 is arranged adjacent to the bottom surface 163 of the light guide plate 16. The illumination device 14 includes a light source 141, two wedges 142, a plurality of O-shaped rings 143, and an electric wire 144. The light source 141 is a cold cathode fluorescent lamp (CCFL) located adjacent to the light entering surface 162 of the light guide plate 16. Two end portions of the light source 141 are embedded in the wedges 142 respectively, and the rings 143 circle the wire 144 and the light source 141 and fix the electric wire 144 along the light source 141. The illumination device 14 is contained in the reflection cover 13. The frame 11 receives the reflection cover 13, the illumination device 14, the reflection sheet 15, and the light guide plate 16.

In assembly, firstly, the light source 141 and the electric wire 144 are both circled by the rings 143 so as to fix the wire 144 along with the light source 141. Secondly, the wedges 142 wedge two end portions of the light source 141 respectively, and then, the illumination device 14 is received in the cover 13. After that, the cover 13 and the illumination device 14 are located adjacent and opposite to the light entering surface 162, and the reflection sheet 15 is arranged at the bottom surface 163 of the light guide plate 16. Finally, the frame 11 receives the cover 13, the reflection sheet 15, and the light guide plate 16 therein.

In operation, part of the light beams emitted from the light source 141 enters the light guide plate 16 directly, and other part of them is reflected by the cover 13 before entering into the light guide plate 16 via the light entering surface 162. Light beams in the light guide plate 16 are guided to become a uniform plane light source and emitted out from the light emitting surface 161.

However, the cold cathode fluorescent lamp contains mercury which is harmful to environment. In addition, for the process of arranging the illumination device 14 in the cover 13 makes the assembly of the backlight module unduly burdensome.

Accordingly, what is needed is a backlight module configured to overcome the above-described problems.

SUMMARY

An exemplary backlight module includes a light guide plate, an illumination device, and plural reflection sheets. The illumination device is opposite to the light guide plate, and includes a supporting member, and plural light emitting diodes formed at the supporting member. The plural reflection sheet is integrally formed with the supporting member.

Other advantages and novel features will become more apparent from the following detailed description when taken in conjunction with the accompanying drawings.

BRIEF DESCRIPTION OF THE DRAWINGS

In the drawings, all the views are schematic.

DETAILED DESCRIPTION OF PREFERRED EMBODIMENTS

Figure 1:
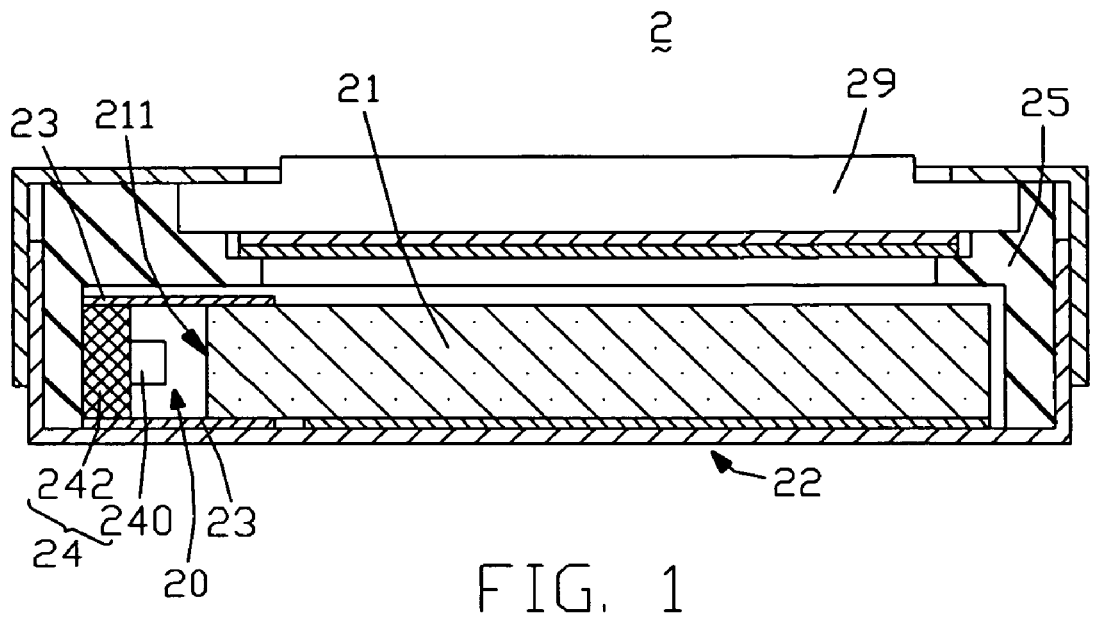
FIG. 1 is a cross-sectional view of a liquid crystal display using light emitting diodes as a light source in accordance with a first embodiment of the present invention.

Referring to FIG. 1, this shows a cross-sectional view of a liquid crystal display 2 in accordance with a first embodiment of the present invention. The liquid crystal display 2 includes a backlight module 22, and a liquid crystal panel 29 arranged above the backlight module 22.

The backlight module 22 includes a light guide plate 21 having a light entering surface 211, an illumination device 20, and a frame 25. The illumination device 20 includes a light source set 24, and two reflection sheets 23. The light source set 24 includes a rectangular supporting member 242 having an electrical circuit (not shown) formed thereat, and a plurality of light emitting diodes 240. The light emitting diodes 240 are formed on the supporting member 242 in a row type (FIG. 1 only shows the first one of the rows), and are electrically connected to the circuit of the supporting member 242. The reflection sheets 23 are formed integrally with the light guide plate 21 and located above and beneath an edge thereof respectively. The reflection sheet 23 arranged above the light guide plate 21 covers a part of a top side thereof, and the reflection sheet 23 arranged at a bottom side of the light guide plate 21 covers a part of a bottom side thereof. The light emitting diodes 240 are powered by a power supply (not shown) in order to emit light beams that enter the light guide plate 21. The reflection sheets 23 and the supporting member 242 cooperate with each other to form a generally U-shaped sided structure. The U-shaped structure is designed to confine light beams and prevent the light beams from leaking therefrom, thereby increasing the utilization of the light beams.

In assembly, firstly, the reflection sheet 23 is engaged with the light guide plate 21 along with a side of the light guide plate 21. After that, the reflection sheet 23, the illumination device 20, and the light guide plate 21 is contained in the frame 25. Finally, the liquid crystal panel 29 is engaged above on the frame 25. Because of that the reflection sheet 23 is formed integrally with the supporting member 242; therefore, an assembly process for the light source set 24 only need a step to locate the light emitting diodes 240 on the supporting member 242 and towards the light entering surface 211 of the light guide plate 21.

Figure 2:
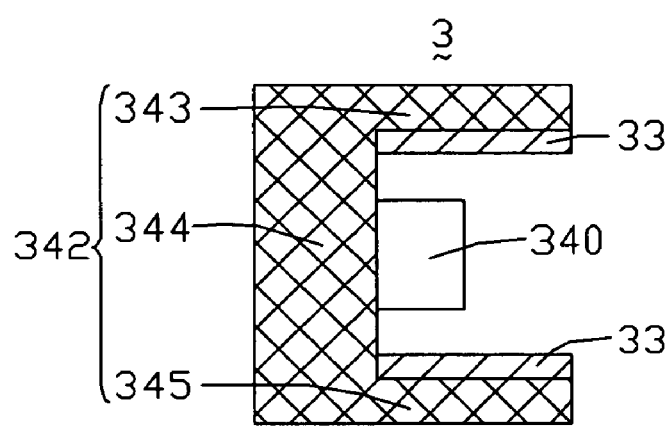
FIG. 2 is an enlarged, cross-sectional view of a part of a backlight module of a liquid crystal display in accordance with a second embodiment of the present invention

Referring to FIG. 2, this shows an enlarged, cross-sectional view of an illumination device 3 of a liquid crystal display in accordance with a second embodiment of the present invention. The illumination device 3 includes a supporting member 342 having an electrical circuit (not shown) formed thereat and a light emitting diode 340. The supporting member 342 includes a first side wall 343, a second side wall 344, and a third side wall 345. The first, second, and third side walls 343, 344, 345 are joined end-to-end to cooperatively form a three-sided closed structure, with the first and third side walls 343, 345 both being substantially perpendicular to the second side wall 344. Thereby, a generally U-shaped structure is formed. The U-shaped structure is designed to confine light beams and prevent the light beams from leaking therefrom. The light emitting diode 340 is formed at the second side wall 344, is electrically connected to the circuit of the supporting member 342, and emits light beams outwardly. Reflection layers 33, made from silver or aluminum, are coated at inner surfaces of the first and third side walls 343, 345 adjacent to the light emitting diode 340. The reflection layers 33 reflect the light beams emitted from the light emitting diode 340 so as to increase the utilization of these light beams.

Figure 3:
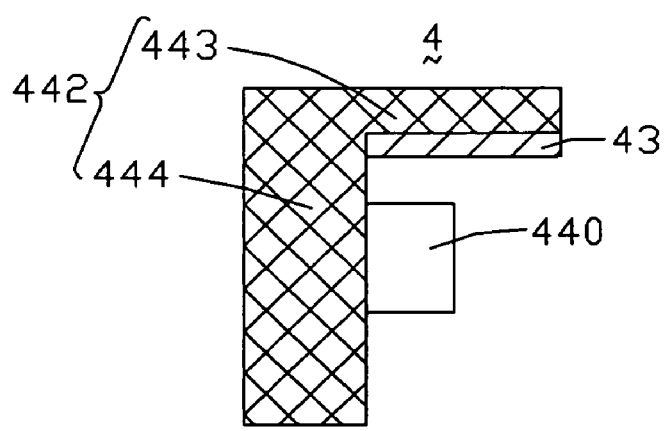
FIG. 3 is an enlarged, cross-sectional view of an illumination device of a liquid crystal display in accordance with a third embodiment of the present invention.

Referring to FIG. 3, this shows an enlarged, cross-sectional view of an illumination device 4 of a liquid crystal display in accordance with a third embodiment of the present invention. The illumination device 4 includes a supporting member 442 having an electrical circuit (not shown) formed thereat, and a light emitting diode 440. The supporting member 442 includes a first side wall 443 and a second side wall 444. The first and second side walls 443, 444 are joined end-to-end to cooperatively form a two-sided structure. In particular, the first and second side walls 443, 444 are substantially perpendicular to each other thereby forming an upside-down L-shaped structure. The light emitting diode 440 is formed on the second side wall 444, is electrically connected to the circuit of the supporting member 442, and emits light beams outwardly. A reflection layer 43, made from silver or aluminum, is coated at an inner surface of the first side wall 443 adjacent to the light emitting diode 440. The reflection layer 43 is for reflecting the light beams emitted from the light emitting diode 440 so as to increase the utilization of these light beams.

Figure 4:
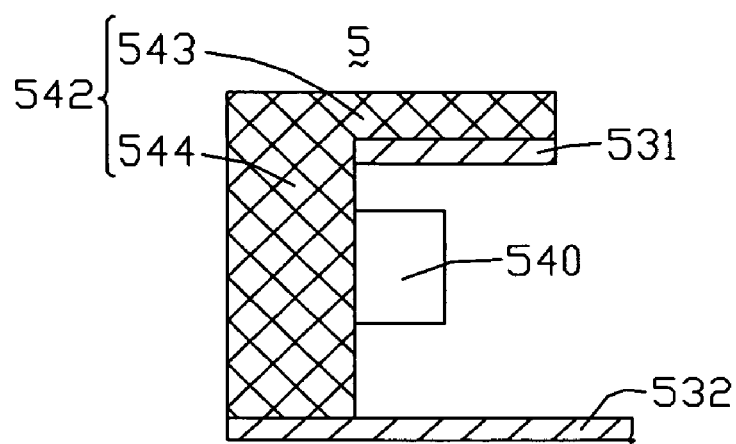
FIG. 4 is an enlarged, cross-sectional view of an illumination device of a liquid crystal display in accordance with a fourth embodiment of the present invention.

Referring to FIG. 4, this shows an enlarged, cross-sectional view of an illumination device 5 of a liquid crystal display in accordance with a fourth embodiment of the present invention. The fourth embodiment is similar to the third embodiment The illumination device 5 includes a supporting member 542 having an electrical circuit (not shown) formed thereat, a light emitting diode 540, and a reflection sheet 532. The supporting member 542 includes a first side wall 543 and a second side wall 544 which are perpendicular to each other and joined end-to-end. The light emitting diode 540 is formed on the first side wall 543, and is electrically connected with the circuit of the supporting member 542. The reflection sheet 532 is formed integrally with the supporting member 542 and is opposite to a reflection layer 531 thereby forming a generally U-shaped structure. The U-shaped structure is designed to confine light beams and prevent the light beams from leaking thereof therefrom. The reflection layer 531 is coated at an inner surface of the first side wall 543 generally adjacent to the light emitting diode 540 for reflecting the light beams. The reflection sheet 532 can increase the utilization of light beams emitted from the light emitting diode 540.

Figure 5:
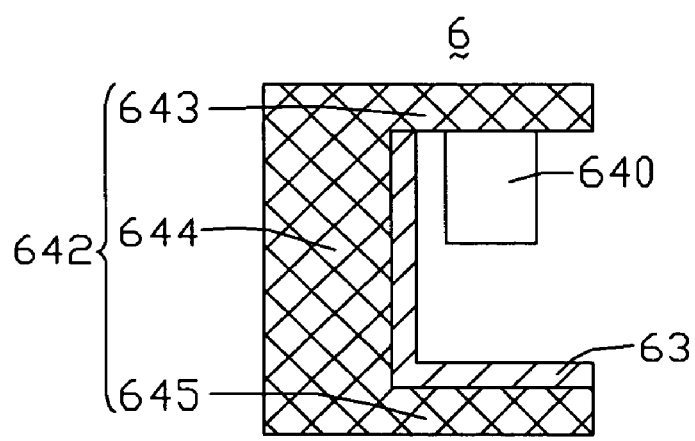
FIG. 5 is an enlarged, cross-sectional view of an illumination device of a liquid crystal display in accordance with a fifth embodiment of the present invention.
Figure 6:
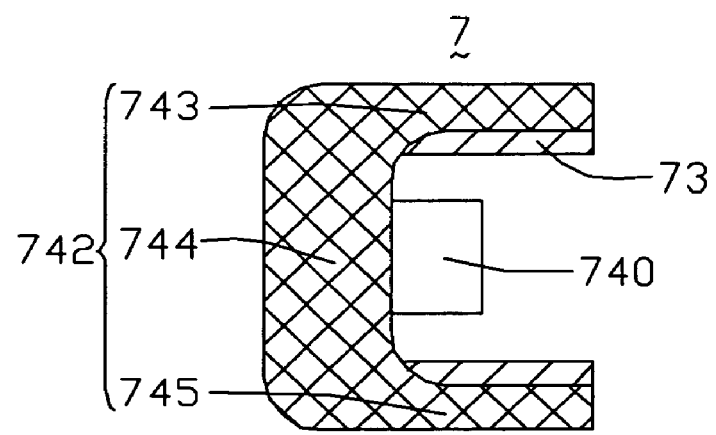
FIG. 6 is an enlarged, cross-sectional view of an illumination device of a liquid crystal display in accordance with a sixth embodiment of the present invention.
Figure 7:
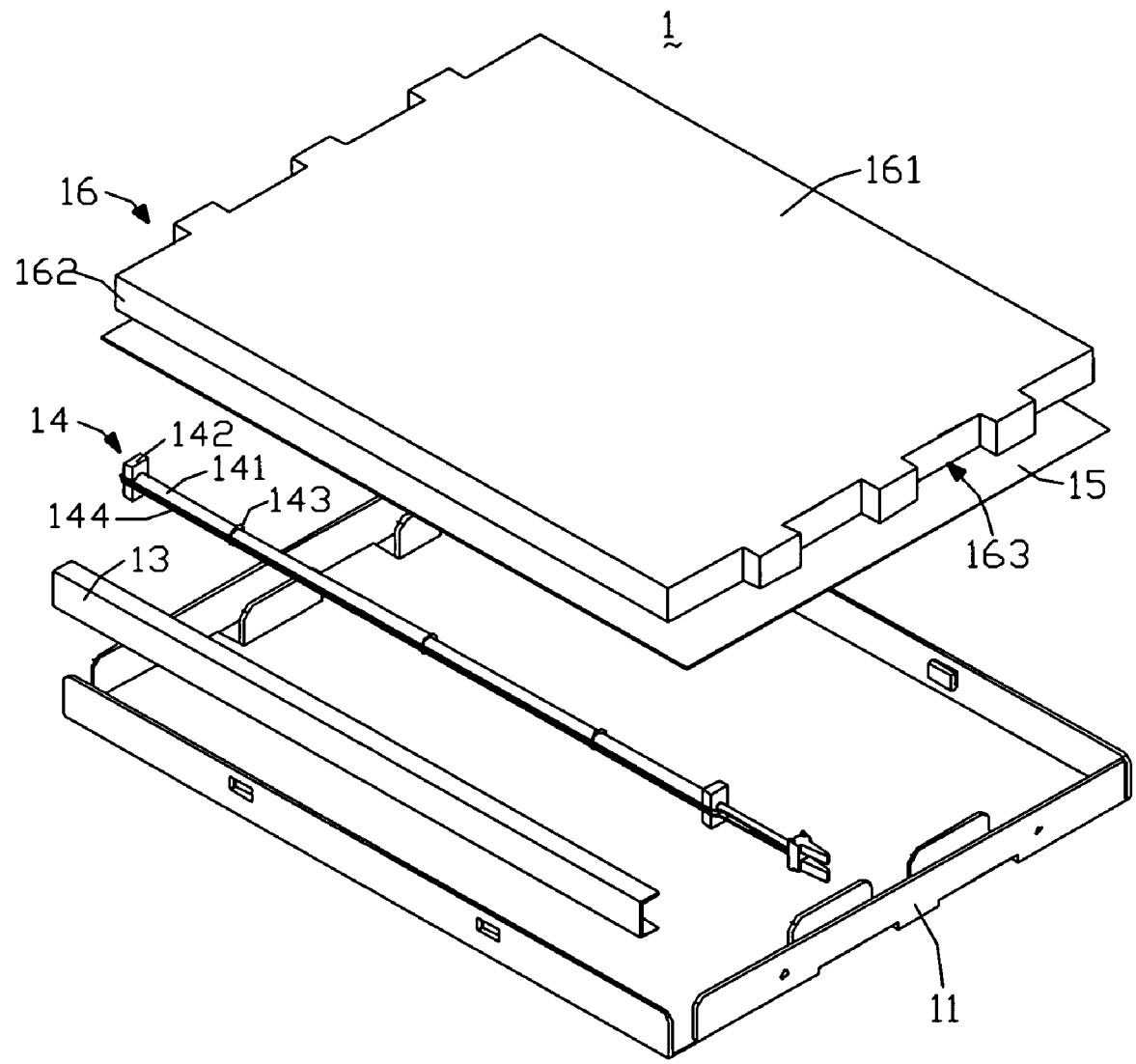
FIG. 7 is an exploded view of a conventional backlight module using cold cathode fluorescent lamp as a light source.

Referring to FIG. 5, this shows an enlarged, cross-sectional view of an illumination device 6 of a liquid crystal display in accordance with a fifth embodiment of the present invention. The fifth embodiment is similar to the second embodiment. The illumination device 6 includes a supporting member 642 having an electrical circuit (not shown) formed thereat, and a light emitting diode 640. The supporting member 642 includes a first side wall 643, a second side wall 644, and a third side wall 645. The light emitting diode 640 is formed on the first side wall 643, and is electrically connected to the circuit of the supporting member 642. A reflection layer 63 is coated at inner surfaces of the second and third side walls 644, 645 thereby forming a substantially L-shaped reflecting structure adjacent to the light emitting diode 640. The reflecting structure is for reflecting the light beams emitted from the light emitting diode 640 so as to increase the utilization of these light beams Referring to FIG. 6, this shows an enlarged, cross-sectional view of an illumination device 7 of a liquid crystal display in accordance with a sixth embodiment of the present invention. The illumination device 7 includes a supporting member 742 having an electrical circuit (not shown)formed thereat, and a light emitting diode 740. The sixth embodiment is similar to the second embodiment. The supporting member 742 includes a first side wall 743, a second side wall 744, and a third side wall 745. Two transitional portions between the first, second, and third side walls 743, 744, and 745 are substantially curved. The light emitting diode 740 is arranged at the second side wall 744, and is electrically connected to the circuit of the supporting member 742. A reflection layer 73 is coated at inner surfaces of the first and third side walls 743, 745 adjacent to the light emitting diode 740 The reflection layer 73 is for reflecting the light beams emitted from the light emitting diode 740 so as to increase the utilization of these beams.

In alternative embodiments, the reflection sheet 532 can be formed integrally with the supporting members 342, 642, and 742 at first side walls 343, 643, 743 and at third side walls 345, 645, and 745, or formed integrally with the supporting member 442 at the second side wall 444. In additional, the reflection layer also can be formed at each side walls, which is not limited to the above-described arrangements.

While preferred and exemplary embodiments have been described above, it is to be understood that the invention is not limited thereto. To the contrary, the above description is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A backlight module, comprising:
   a light guide plate comprising a light entering surface;
   an illumination device opposite to the light guide plate, the illumination device comprising a supporting member, and at least one light emitting diode formed at the supporting member and electrically connected to the supporting member; and
   two reflection sheets integrally formed with both the supporting member and the light guide plate, one of the reflection sheets directly covering a part of a top side of the light guide plate adjacent to the light entering surface, and the other of the reflection sheets directly covering a part of a bottom side of the light guide plate adjacent to the light entering surface.

2. The backlight module as claimed in claim 1, wherein the supporting member comprises a first side wall and a second side wall connected end to end to cooperatively from an L-shaped structure, the second side wall facing the light entering surface of the light guide plate.

3. The backlight module as claimed in claim 2, wherein the at least one light emitting diode is formed at the second side wall.

4. The backlight module as claimed in claim 1, wherein the supporting member comprises a first side wall, a second side wall, and a third side wall, the first side wall, the second side wall, and the third side wall are joined end-to-end to cooperatively form a three-sided structure, the second side wall interconnecting the first side wall and the third side wall and facing the light entering surface of the light guide plate.

5. The backlight module as claimed in claim 4, wherein the at least one light emitting diode is formed at the second side wall.

6. The backlight module as claimed in claim 1, wherein the light guide plate, the supporting member, and the reflection sheets are integrated together as a single unitary body.

7. A liquid crystal display, comprising:
a liquid crystal panel; and
a backlight module opposite to the liquid crystal panel, the backlight module comprising:
a light guide plate comprising a light entering surface; and
an illumination device adjacent to the light entering surface of the light guide plate; and the illumination device comprising:
a supporting member;
at least one light emitting diode, the at least one light emitting diode being formed at the supporting member and electrically connected to the supporting member; and
two reflection sheets integrally formed with both the supporting member and the light guide plate, one of the reflection sheets directly covering a part of a top side of the light guide plate adjacent to the light entering surface, and the other of the reflection sheets directly covering a part of a bottom side of the light guide plate adjacent to the light entering surface.

8. The liquid crystal display as claimed in claim 7, wherein the supporting member comprises a first side wall and a second side wall joined end to end to cooperatively form an L-shaped structure.

9. The liquid crystal display as claimed in claim 8, wherein the second side wall faces the light entering surface of the light guide plate, and the at least one light emitting diode is formed at the second side wall.

10. The liquid crystal display as claimed in claim 7, wherein the light guide plate, the supporting member, and the reflection sheets are integrated together as a single unitary body.

* * * * *